(12) United States Patent
Huang et al.

(10) Patent No.: US 7,053,901 B2
(45) Date of Patent: May 30, 2006

(54) SYSTEM AND METHOD FOR ACCELERATING A SPECIAL PURPOSE PROCESSOR

(75) Inventors: Jen-Hsun Huang, Los Altos, CA (US); Michael Brian Cox, Menlo Park, CA (US); Ziyad S. Hakura, Palo Alto, CA (US); John S. Montrym, Cupertino, CA (US); Brad W. Simeral, San Francisco, CA (US); Brian Keith Langendorf, Benicia, CA (US); Blanton Scott Kephart, Dallas, TX (US); Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 93 days.

(21) Appl. No.: 10/732,445

(22) Filed: Dec. 11, 2003

(65) Prior Publication Data

US 2005/0128203 A1  Jun. 16, 2005

(51) Int. Cl.
*G06T 1/00* (2006.01)

(52) U.S. Cl. ..................... 345/503; 345/506
(58) Field of Classification Search ........ 345/501–503, 345/421, 422, 426, 427, 506, 530, 545, 522, 345/418
See application file for complete search history.

(56) References Cited

U.S. PATENT DOCUMENTS

| | | | |
|---|---|---|---|
| 5,579,455 A | * | 11/1996 | Greene et al. .............. 345/422 |
| 5,706,478 A | | 1/1998 | Dye |
| 5,898,437 A | * | 4/1999 | Deolaliker ................... 345/421 |
| 5,936,641 A | | 8/1999 | Jain et al. |
| 6,097,400 A | * | 8/2000 | Dilliplane et al. .......... 345/443 |
| 6,184,908 B1 | * | 2/2001 | Chan et al. ................. 345/522 |
| 6,247,113 B1 | | 6/2001 | Jaggar |
| 6,323,860 B1 | * | 11/2001 | Zhu et al. ................... 345/427 |
| 6,452,595 B1 | | 9/2002 | Montrym et al. |
| 6,476,808 B1 | * | 11/2002 | Kuo et al. ................... 345/422 |
| 6,624,816 B1 | | 9/2003 | Jones, Jr. |
| 6,646,639 B1 | * | 11/2003 | Greene et al. .............. 345/422 |
| 2003/0122820 A1 | * | 7/2003 | Doyle ......................... 345/421 |

OTHER PUBLICATIONS

Salamone, Salvatore, "Compatible VPN Wares Support Range of Users, Apps", INTERNETWEEK.com, http://www.internetwk.com/news/news0710-5.htm, Jul. 10, 1998, 2 pgs.

"SEGA's Naomi 2 Technical Overview", *Dreamcast Technical Pages,* http://www.segatech.com/arcade/naomi2/, printed from web Dec. 4, 2003, 4 pgs.

* cited by examiner

*Primary Examiner*—Kee M. Tung
(74) *Attorney, Agent, or Firm*—Cooley Godward LLP (57) ABSTRACT

Embodiments of the invention accelerate at least one special purpose processor, such as a GPU, or a driver managing a special purpose processor, by using at least one co-processor. Advantageously, embodiments of the invention are fault-tolerant in that the at least one GPU or other special purpose processor is able to execute all computations, although perhaps at a lower level of performance, if the at least one co-processor is rendered inoperable. The co-processor may also be used selectively, based on performance considerations.

28 Claims, 10 Drawing Sheets

SYSTEM AND METHOD FOR ACCELERATING A SPECIAL PURPOSE PROCESSOR

BACKGROUND

The invention relates generally to the field of data processing. More specifically, the invention relates to a system and method for processing using a special purpose processor.

Desktop computers and other data processing systems typically include a Central Processing Unit (CPU) to perform arithmetic calculations, logical operations, control functions and/or other processes. Many applications are processor-intensive. In rendering three-dimensional (3D) scenes for display, for example, each image object is typically described using hundreds or thousands or even tens of thousands of geometric objects called primitives (typically triangles or other polygons). A scene may be represented by the combination of hundreds or thousands of primitives. The surface of each object may be textured and shaded to render a realistic-looking 3D image. The calculations necessary to define, position, texture, shade, and render primitives to a display device within given time constraints can overwhelm the processing capacity (or bandwidth) of the CPU.

Many approaches have been developed to off-load processing from the CPU. One approach is to add additional general purpose CPUs in a multi-processing configuration. A disadvantage of this approach is that the general purpose CPUs may not be well-suited to the computational requirements of some applications. In addition, multi-processing requires a certain amount of synchronization and management overhead, which can create inefficiencies in the primary CPU.

Instead of adding CPU's, a special-purpose processor can be used to off-load particular tasks from the CPU. In graphics applications, for example, a special-purpose processor called a Graphics Processing Unit (GPU) is sometimes used to off-load from the CPU those computations associated with the generation and/or rendering of 3D graphics. Special-purpose processors may also be used for controlling data storage disks, network communications, or other functions. Driver software, under the control of an application or Operating System (OS) is used to manage the interface to the special purpose processor.

Known systems and methods for off-loading computations from the CPU to a special-purpose processor also have various disadvantages, however. For example, in the case of graphics processing, even the GPU may become overburdened. Moreover, in known applications, when the special purpose processor fails, the entire functionality that was performed by the special purpose processor is lost.

Therefore, a need exists for a system and method that enables a special-purpose processor, such as a GPU, to be accelerated, preferably in a way that is flexible, scalable, and fault tolerant.

SUMMARY OF THE INVENTION

Embodiments of the invention accelerate at least one special-purpose processor, such as a GPU, or a driver managing a special purpose processor, by using at least one co-processor. The invention provides flexibility in that alternative embodiments may be selectively implemented. Any of the disclosed embodiments may be scaled by adding one or more special purpose processors and/or co-processors. Advantageously, embodiments of the invention are fault tolerant in that the GPU or other special-purpose processor is able to execute all computations, although perhaps at a lower level of performance, if the co-processor is rendered inoperable. The co-processor may also be used selectively, based on performance considerations.

The features and advantages of the invention will become apparent from the following drawings and detailed description.

BRIEF DESCRIPTION OF THE DRAWINGS

Embodiments of the invention are described with reference to the following drawings, wherein.

DETAILED DESCRIPTION

Figure 8:
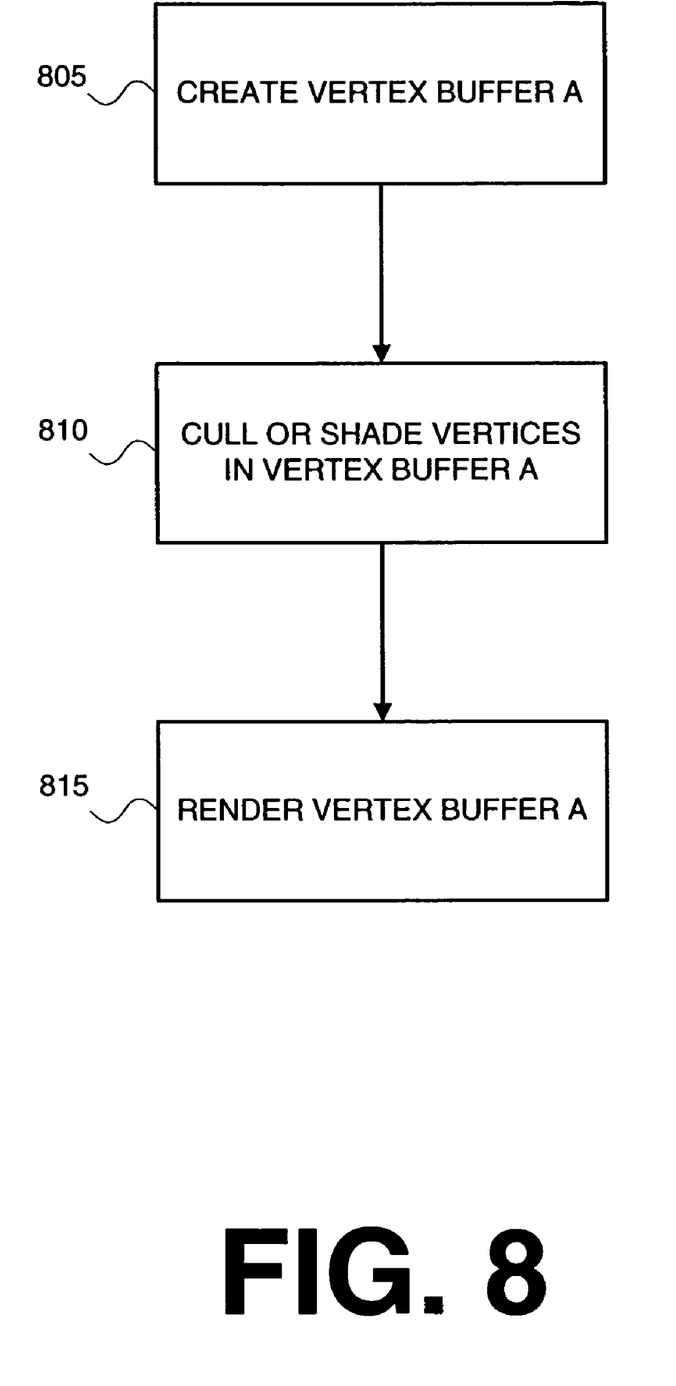
FIG. 8 is a process flow diagram of a method for performing vertex shading, according to an embodiment of the invention.
Figure 9:
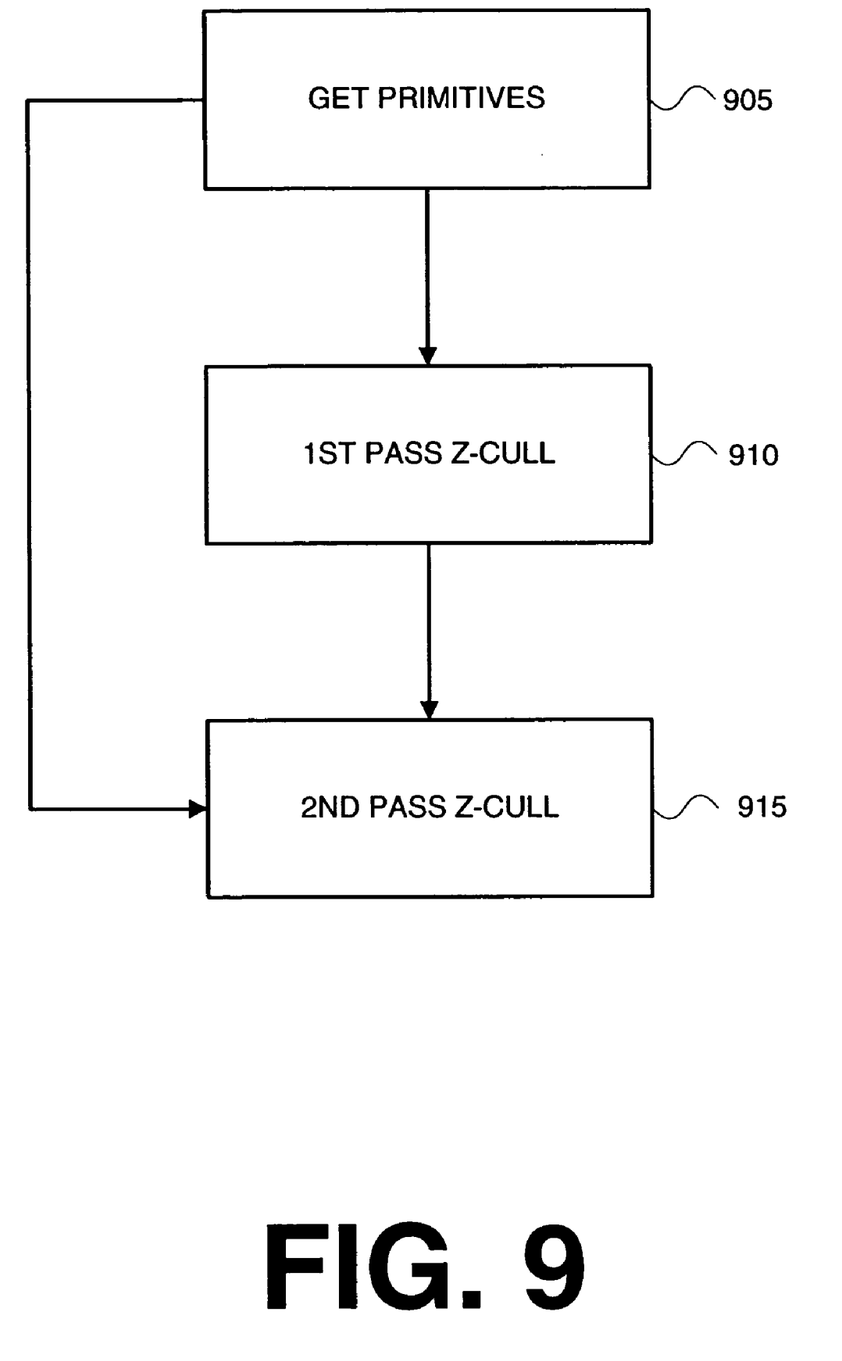
FIG. 9 is a process flow diagram of a method for performing two-pass Z-cull, according to an embodiment of the invention.

Embodiments of the invention employ a co-processor to accelerate the processing of a special purpose processor, with a Graphics Processing Unit (GPU) being an example of such a special purpose processor. In describing embodiments of the invention, four alternative functional architectures are presented with reference to FIGS. 1–4. A method for fault tolerant operation, for example when the co-processor is not operational, is described with reference to FIG. 5A. A method for selective use of the co-processor is described with reference to FIG. 5B. Then, two alternative instantiations of a co-processor are provided with reference to FIGS. 6 and 7. FIGS. 8 and 9 provide two exemplary applications in connection with an embodiment of the invention in the graphics processing arena: acceleration of vertex shading; and two-pass Z-cull, respectively.

Sub-headings are used below for organizational convenience only; any particular feature may be described in more than one section.

Architecture

FIGS. 1–4 illustrate alternative functional architectures for a system having application software, a driver element, a special purpose processor and a co-processor that accelerates the special purpose processor. In these illustrated embodiments, the driver is a graphics driver 110, the special purpose processor is a GPU (120, 210, 310, 410, respectively) and the co-processor (115, 205, 305, 405, respectively) is used to accelerate the GPU (120, 210, 310, 410, respectively). In the illustrated embodiments, the application software 105 and graphics driver 110 may be resident on, or executed by, a CPU (not shown). The graphics driver 110 manages the processing tasks performed on the co-processor and/or the GPU.

Figure 1:
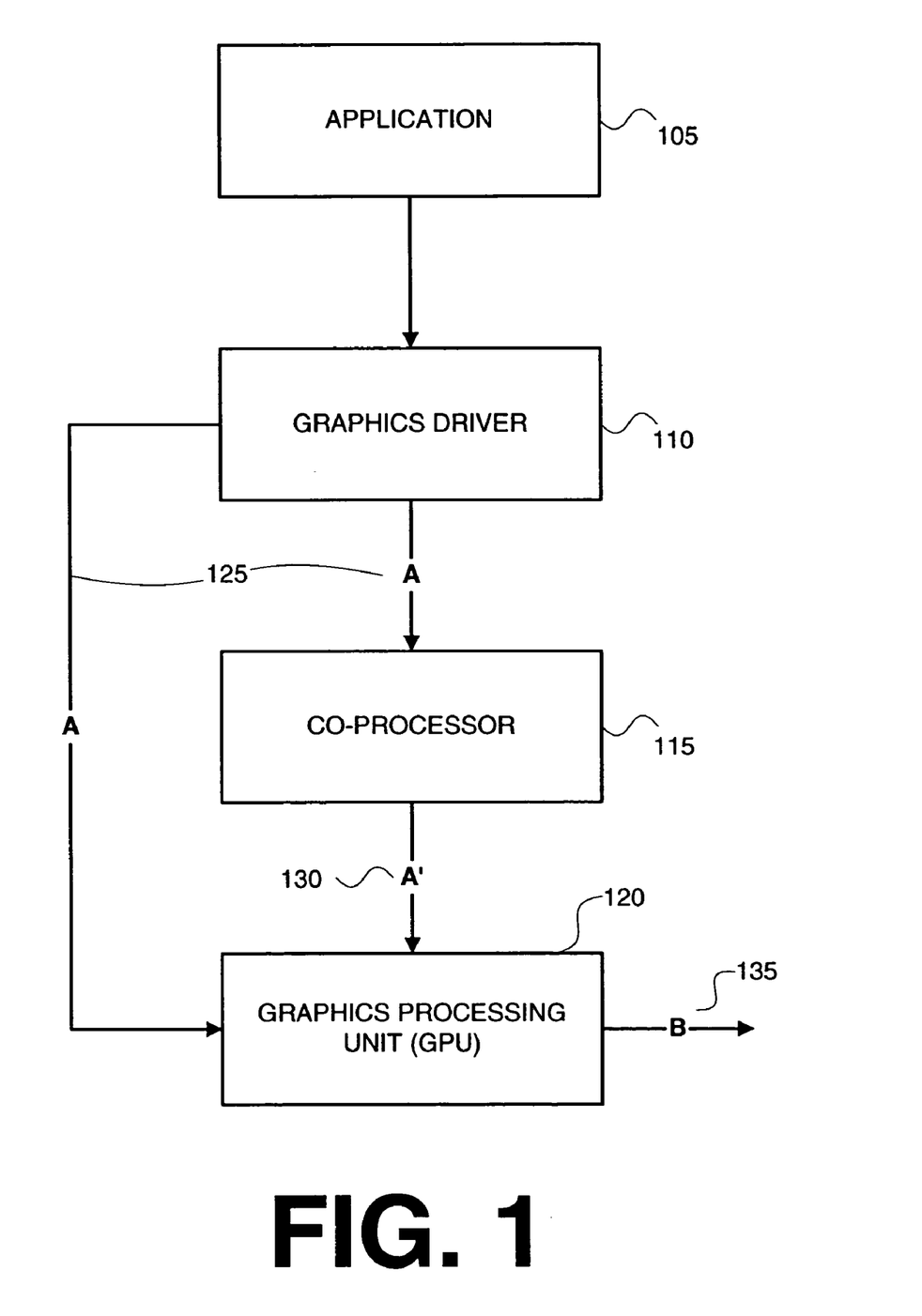
FIG. 1 is a block diagram of a functional system architecture, according to an embodiment of the invention.

FIG. 1 is a block diagram of a functional system architecture, according to an embodiment of the invention. As shown therein, the graphics driver 110 provides data A (125) to the co-processor 115 and to the GPU 120. The co-processor 115 outputs a transformation of A (125), the transformation being A' (130), to the GPU 120. Then GPU 120 uses A (125) and A' (130) as inputs to produce output B (135). Advantageously, the availability of A' (130) enables the GPU 120 to produce output B (135) in less time than if A (125) were the only input to the GPU 120.

Figure 2:
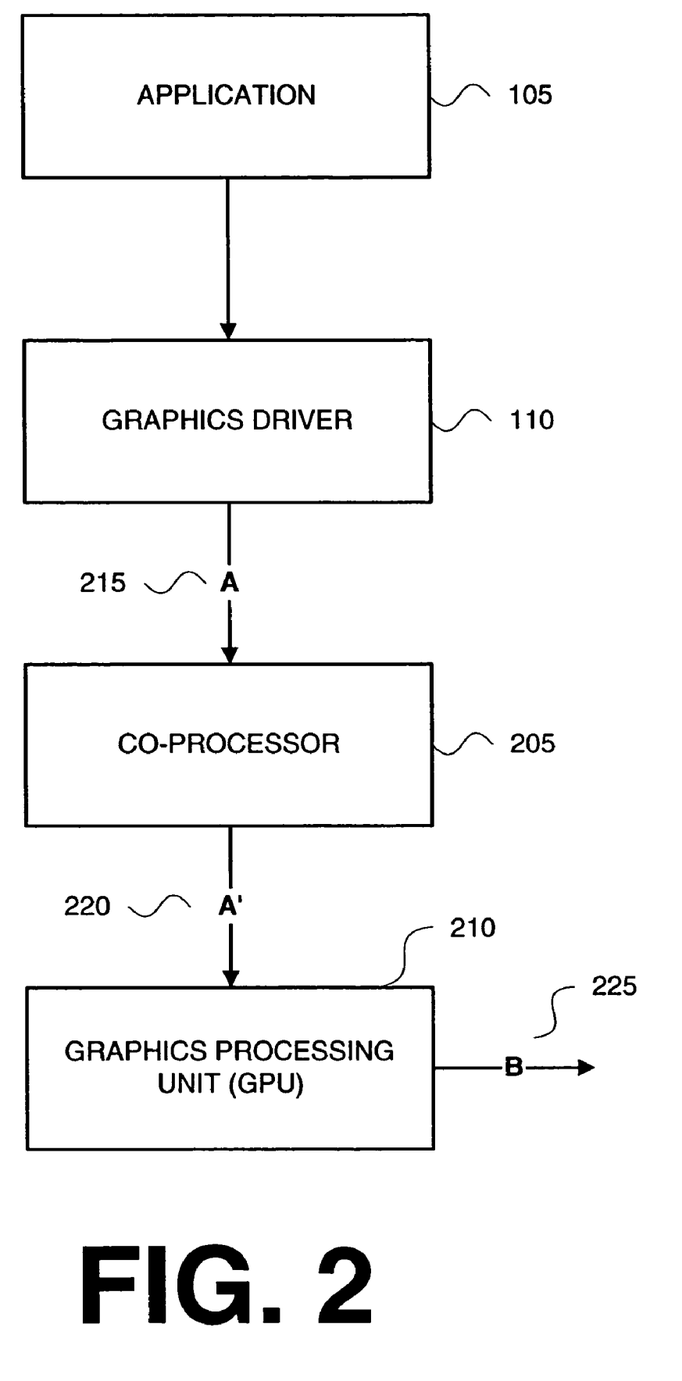
FIG. 2 is a block diagram of a functional system architecture, according to an embodiment of the invention.

FIG. 2 is a block diagram of a functional system architecture, according to an embodiment of the invention. As shown therein, the graphics driver 110 provides data A (215) to the co-processor 205. The co-processor 205 outputs a transformation of A (215), the transformation being A' (220), to the GPU 210. Then GPU 210 uses A' (220) to produce output B (225).

Figure 3:
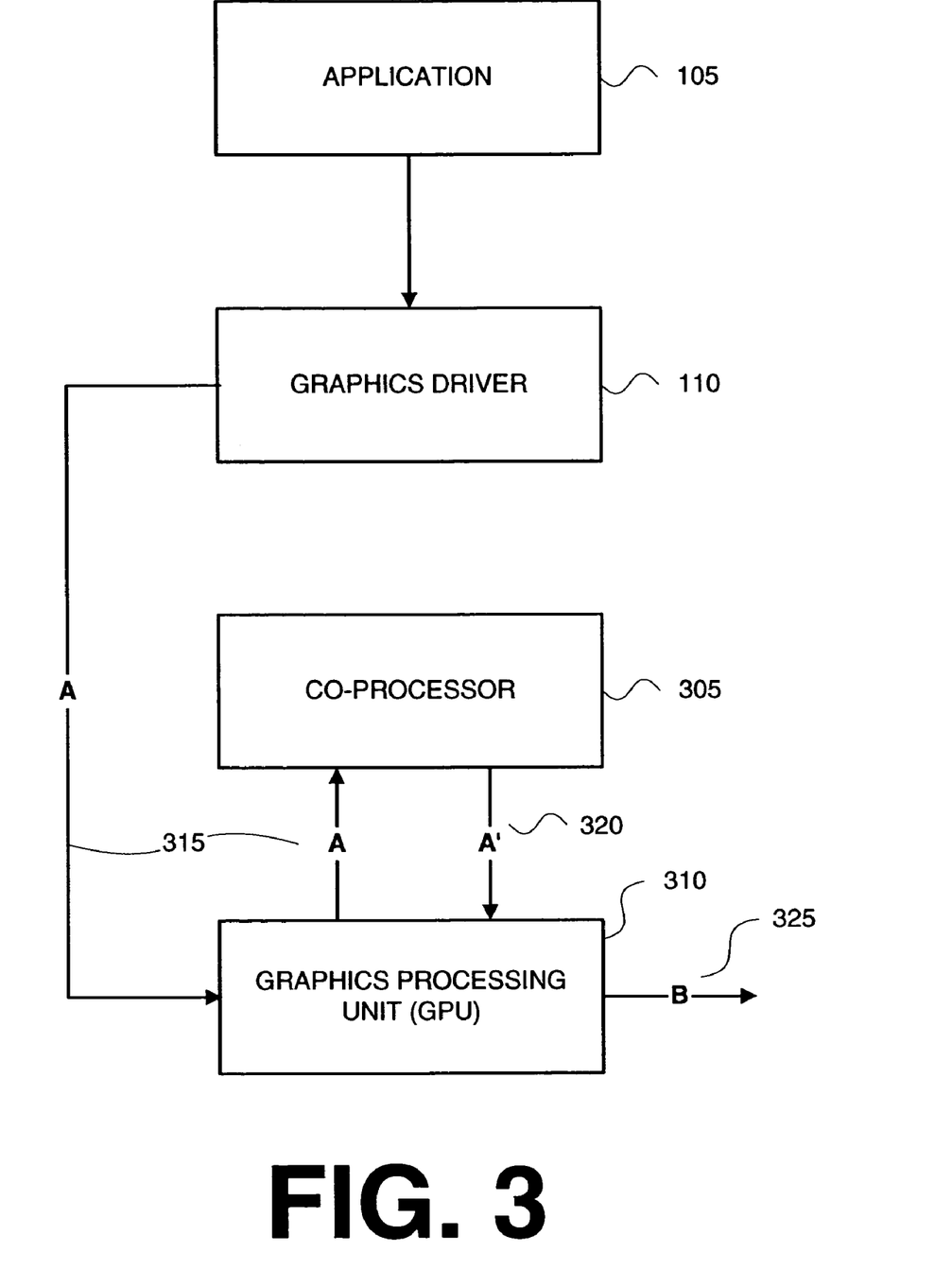
FIG. 3 is a block diagram of a functional system architecture, according to an embodiment of the invention.

FIG. 3 is a block diagram of a functional system architecture, according to an embodiment of the invention. As shown therein, the graphics driver 110 provides data A (125) to the GPU 310. The GPU 310 passes data A (125) to the co-processor 305. The co-processor 305 outputs a transformation of A (125), the transformation being A' (130), to the GPU 310. Then GPU 310 uses A (315) and A' (320) as inputs to produce output B (325). Advantageously, the availability of A' (320) enables the GPU 310 to produce output B (325) in less time than if A (315) were the only input to the GPU 310.

Figure 4:
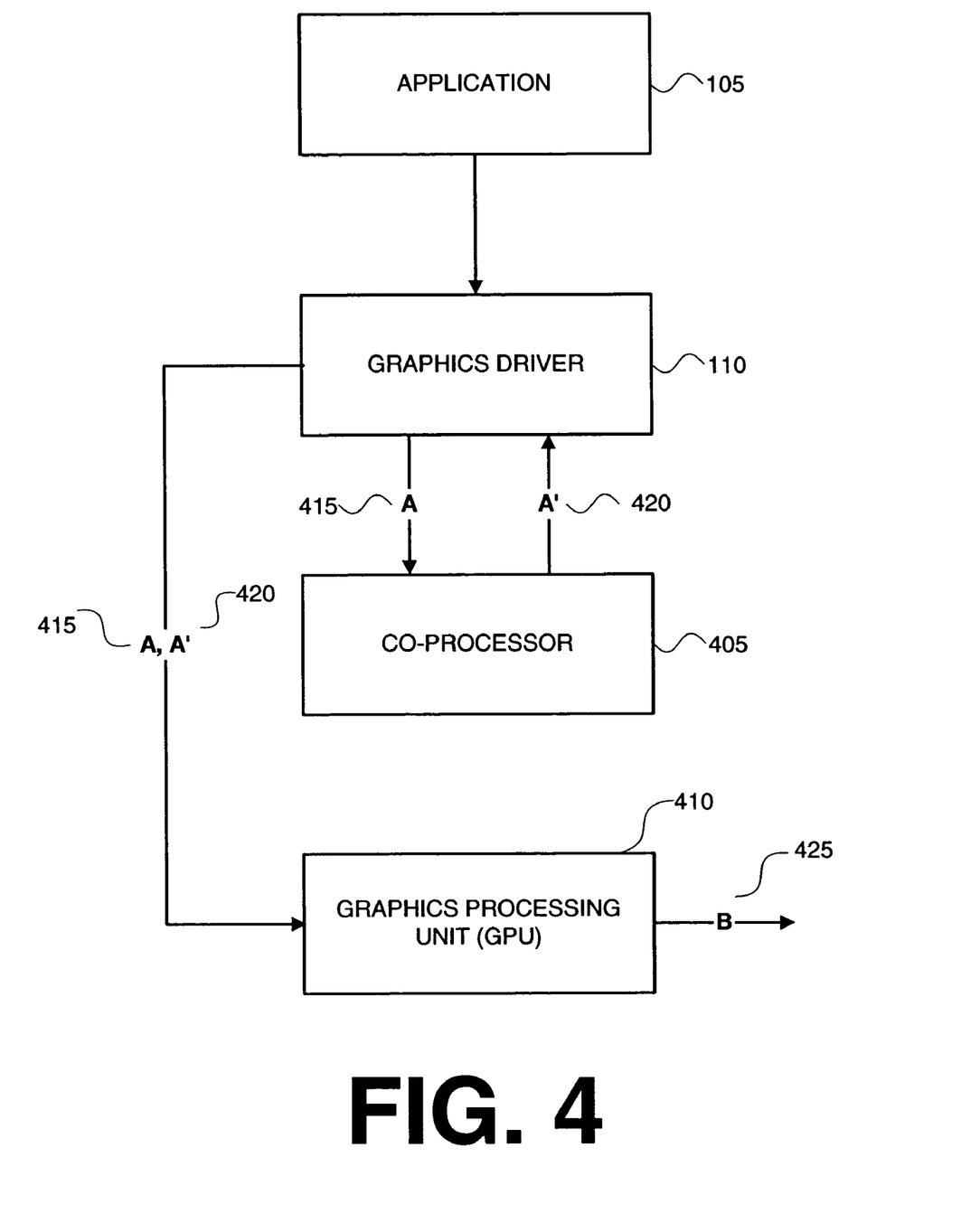
FIG. 4 is a block diagram of a functional system architecture, according to an embodiment of the invention.

FIG. 4 is a block diagram of a functional system architecture, according to an embodiment of the invention. As shown therein, the graphics driver 110 provides data A (415) to the co-processor 405. The co-processor 405 then outputs a transformation of A (415), the transformation being A' (420), to the graphics driver 110. The graphics driver 110 then outputs both A (415) and A' (420) to the GPU 410. Then the GPU 410 uses both A (415) and A' (420) as inputs to produce output B (425). Advantageously, the availability of A' (420) enables the GPU 410 to produce output B (425) in less time than if A (415) were the only input to the GPU 410.

Thus, with reference to FIG. 4, the co-processor 405 can accelerate the GPU 410. Where co-processor 405 performs particular processing tasks typically associated with the graphics driver 110, however, it can be said that the co-processor 405 has accelerated the processing of the graphics driver 110 which is managing the GPU 410. The architectures described with reference to FIGS. 1–3 could likewise operate to accelerate the graphics driver 110.

In one embodiment of the invention, the graphics driver 110 selectively implements two or more alternative functional architectures according application-specific performance needs or resource availability. For example, for one processing task, the graphics driver 110 implements the functional architecture illustrated in FIG. 1, while for a different processing task the graphics driver 100 implements the functional architecture illustrated in FIG. 4. Thus, embodiments of the disclosed invention may be used in the alternative, or in combination, to provide a flexible processing solution.

The architectures described above may be modified without departing from the scope and spirit of the invention. For example, although each of the embodiments illustrated in FIGS. 1–4 are described with reference to an application involving graphics processing, the invention is applicable to other drivers or interfaces in place of the graphics driver 110, and another type of special purpose processor may be used in place of the GPU (135, 210, 310, and 410), as appropriate to the type of application 105.

In addition, any of the functional architectures illustrated in FIGS. 1–4 can be modified so that multiple co-processors provide transforms to the GPU (135, 210, 310, or 410) or other special purpose processor to accelerate processing. Moreover, in other embodiments, a single co-processor can be used to accelerate the operation of multiple GPU's (135, 210, 310, or 410) or other special purpose processors. Accordingly, embodiments of the invention disclosed herein are scalable, according to application requirements.

Depending upon the application, the co-processor (115, 205, 305, 405, 625, 730) may have the capability to perform relatively simple tasks. For example, in the graphics processing environment, the co-processor could perform a first pass z-cull process (described below). In other embodiments, the co-processor (115, 205, 305, 405, 625, 730) can have all the functionality of a GPU (120, 210, 310, 410, 635, 735) or other special purpose processor that is being accelerated by the co-processor.

Fault Tolerance

Figure 5A:
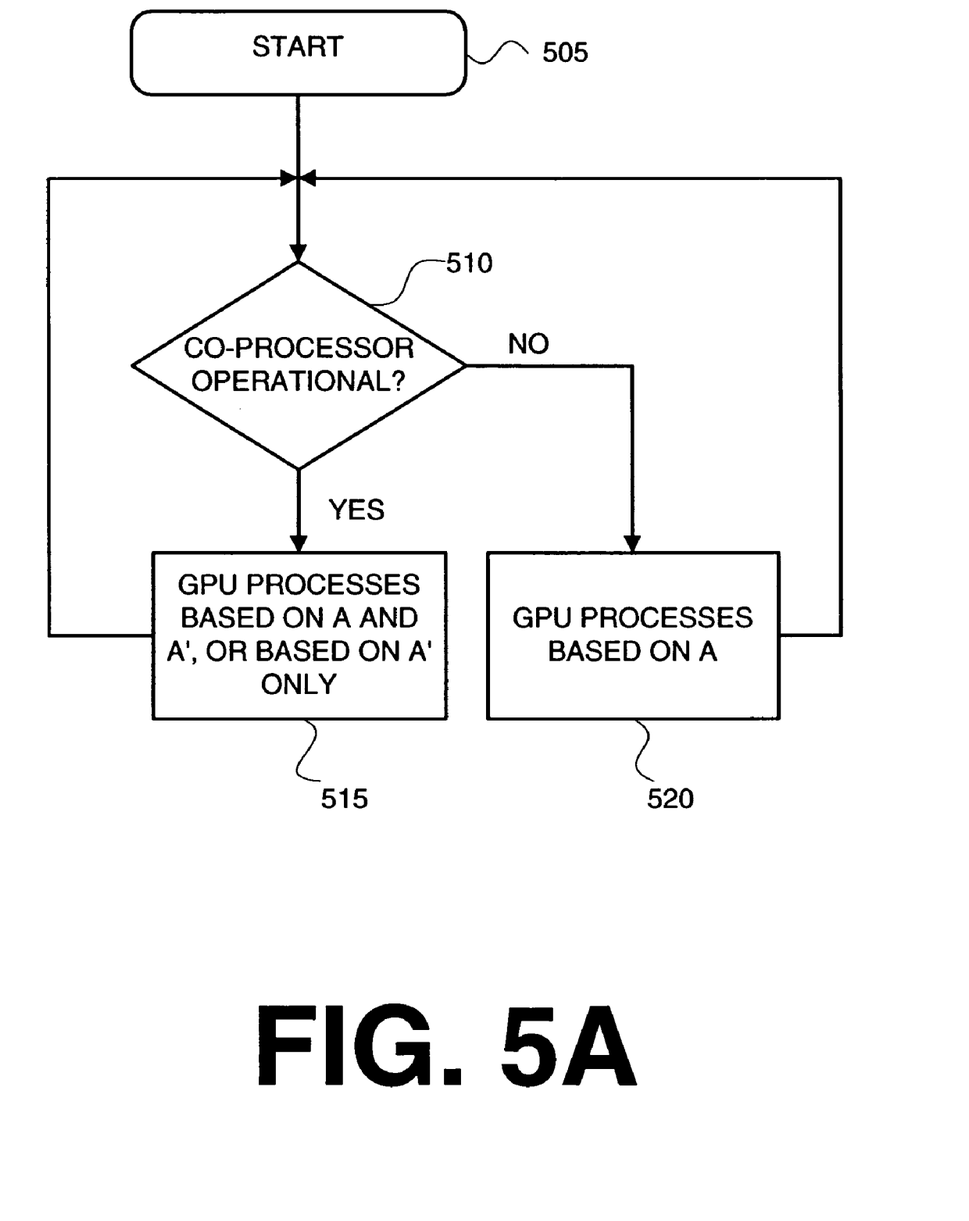
FIG. 5A is a process flow diagram of a method for fault tolerance, according to an embodiment of the invention.

FIG. 5A is a process flow diagram of a method for fault tolerance, according to an embodiment of the invention. FIG. 5A illustrates a method for reacting to the failure of co-processor 115, 305, or 405, for example. As shown therein, the process begins in step 505, then advances to conditional step 510 to determine whether the co-processor is operational. Where the result of conditional step 510 is in the affirmative (yes), the process advances to step 515 where the GPU or other special-purpose processor operates on inputs A and A', or based on A' only (A' is the output of the co-processor, as described with reference to FIGS. 1–4 above). Where the result of conditional step 510 is in the negative (no), the process advances to step 520 where the GPU or other special-purpose processor operates on input A alone (e.g., without results from the co-processor).

The fault-tolerant process illustrated in FIG. 5A can be implemented for any of the architectures illustrated in FIGS. 1, 3, and 4, according to design choice.

In cases where the co-processor has failed, and the GPU or other special-purpose processor operates based on A alone (e.g., step 520), performance may be degraded. For instance, according to design choice, it may be predetermined that one or more of pixel resolution, color resolution, or frame speed may be decreased when one or more co-processors have failed.

Selective Use of the Co-Processor

Even where one or more co-processor(s) is (are) operational, use of the one or more co-processor(s) may not always improve performance compared to use of a special purpose processor alone. Accordingly, the selective use of a co-processor may be advantageous.

Figure 5B:
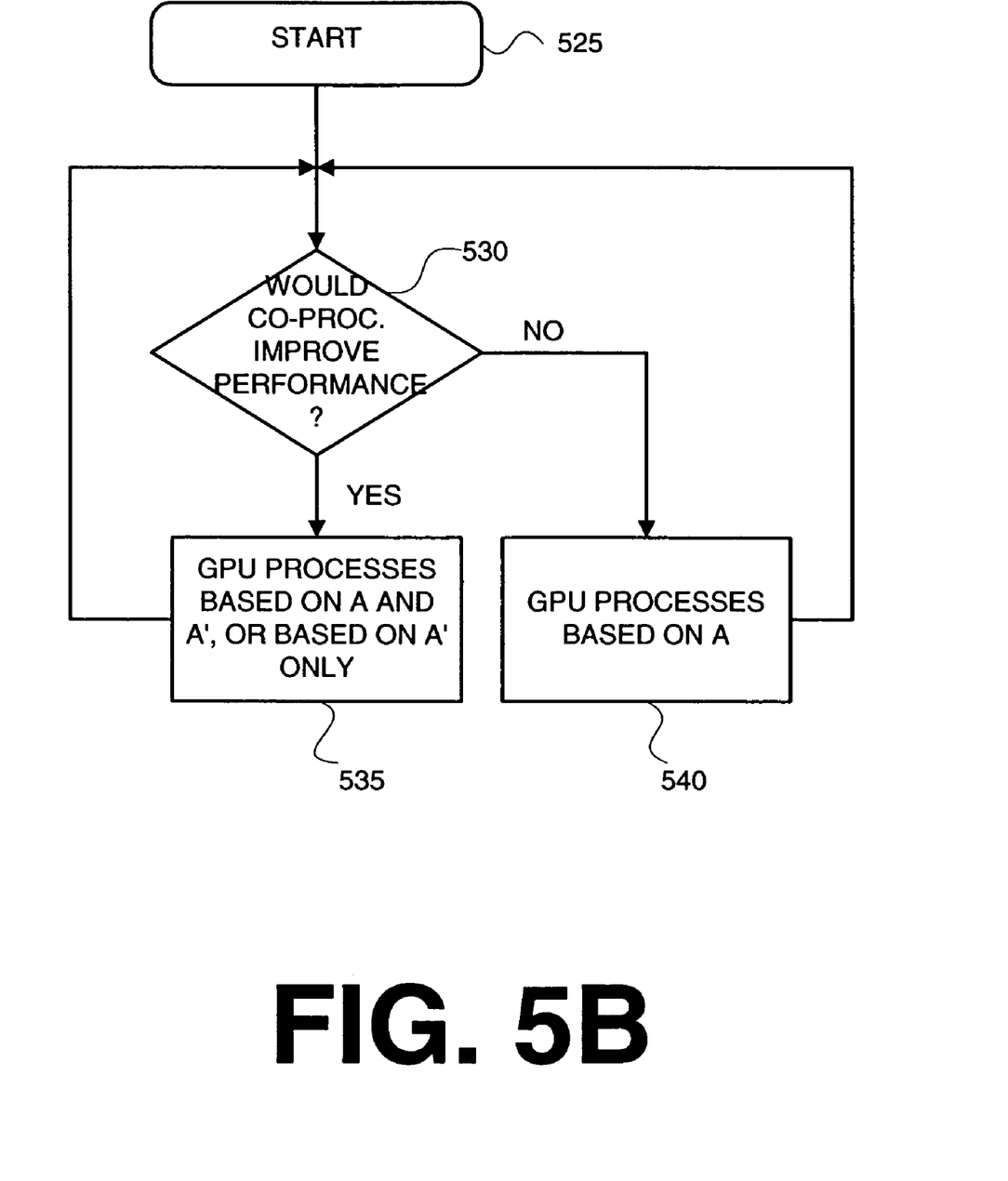
FIG. 5B is a process flow diagram of a method for selective use of a co-processor, according to an embodiment of the invention.

FIG. 5B is a process flow diagram of a method for selective use of a co-processor, according to an embodiment of the invention. As shown therein, the process begins in step 525, then advances to conditional step 530 to determine whether use of the co-processor would improve performance. Performance may relate to processing speed, accuracy, or other criteria. Where the result of conditional step 530 is in the affirmative (yes), the process advances to step 535 where the GPU or other special-purpose processor operates on inputs A and A', or based on A' only (A' is the output of the co-processor, as described with reference to FIGS. 1–4 above). Where the result of conditional step 530 is in the negative (no), the process advances to step 540 where the GPU or other special-purpose processor operates on input A alone (e.g., without results from the co-processor).

There are at least three embodiments of conditional step 530 that may be used in the alternative, or in any combination. In a first embodiment of conditional step 530, it is predetermined which applications, or tasks, achieve improved performance through the use of a co-processor. In this instance, the operation of conditional step 530 is based on the predetermined settings. The predetermined settings may be included in a look-up table.

In a second embodiment of conditional step 530, historical data (e.g., a log of actual processing times with and without use of the co-processor) are used to determine whether application of a co-processor would improve performance. For example, operation of conditional step 530 may include a comparison of average processing times with and without use of a co-processor.

In a third embodiment of conditional step 530, the determination of whether a co-processor would improve performance is based on instantaneous, or near instantaneous, knowledge. For example, with reference to FIG. 1, if the GPU 120 does not receive A' in time to begin processing frame N+1, then it can be determined in conditional step 530 that the co-processor 115 would not improve performance. On the other hand, if the GPU 120 does receive A' in time to begin processing frame N+2, then it can be determined in conditional step 530 that the co-processor would improve performance. As a further example, with reference to FIG. 2, the co-processor 205 could poll a status register of GPU 210 to determine the earliest point when GPU 210 can begin processing data. Where GPU 210 can begin processing, and where the co-processor 205 has not completed calculation of A', the co-processor could send A to GPU 210 instead of A'. As yet another example, with reference to FIG. 3, a normal operational mode for GPU 310 may be to fetch A' from the co-processor 305 when the GPU 310 begins processing A. Co-processor 305 may be configured such that if co-processor 305 is not done calculating A' when the co-processor 305 receives a fetch command from GPU 310, the co-processor 305 will send a null to the GPU 310 in response to the fetch command. Where the GPU 310 receives a null, the result of conditional step 530 is in the negative (no), and the GPU 310 processes based on A alone (step 540).

As described above, the operation of conditional step 530 may be performed in any one or more of the graphics driver, co-processor, and/or GPU, according to design requirements.

Co-Processor Instantiation

Figure 6:
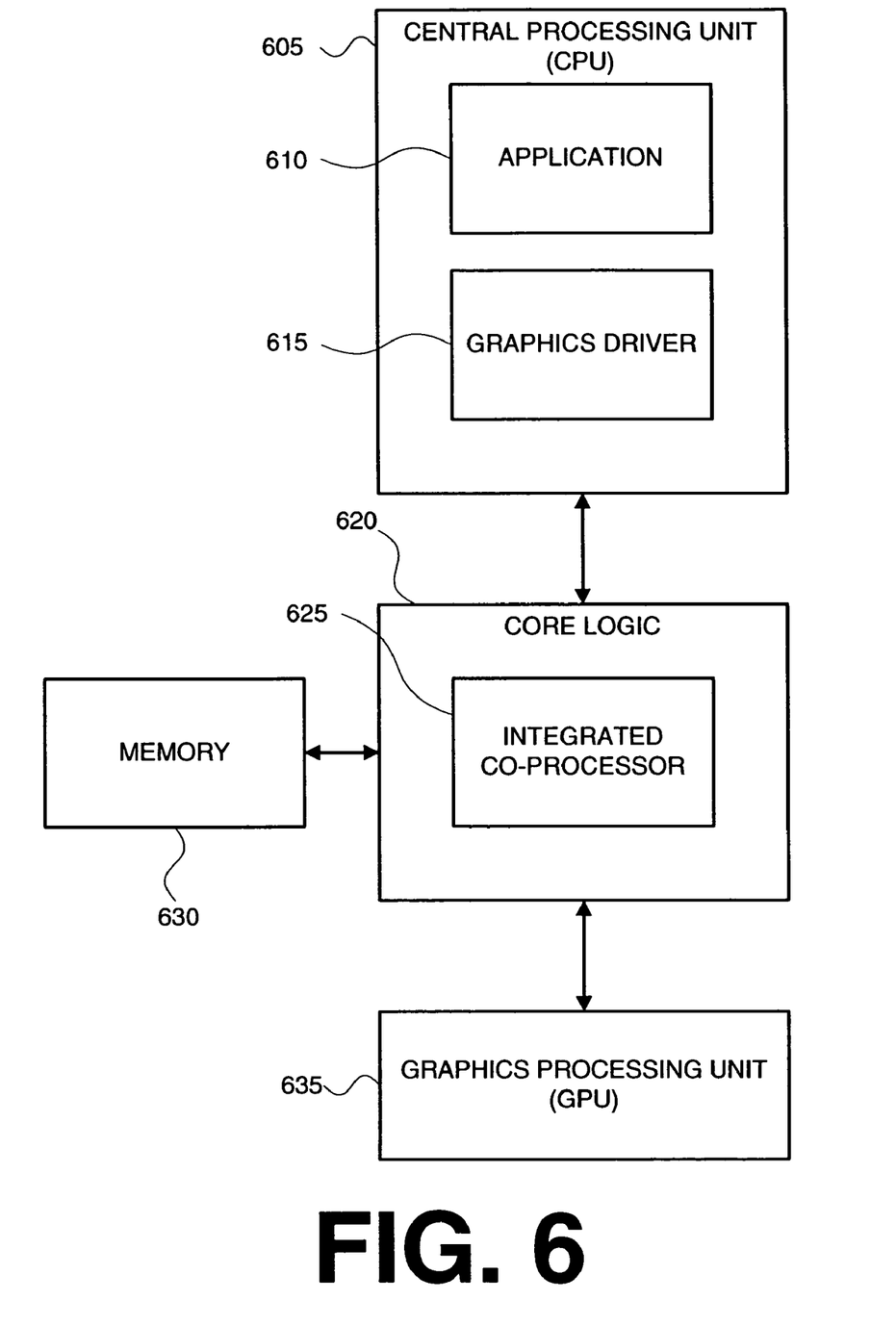
FIG. 6 is a block diagram of a functional system architecture illustrating an instantiation of a co-processor, according to one embodiment of the invention.
Figure 7:
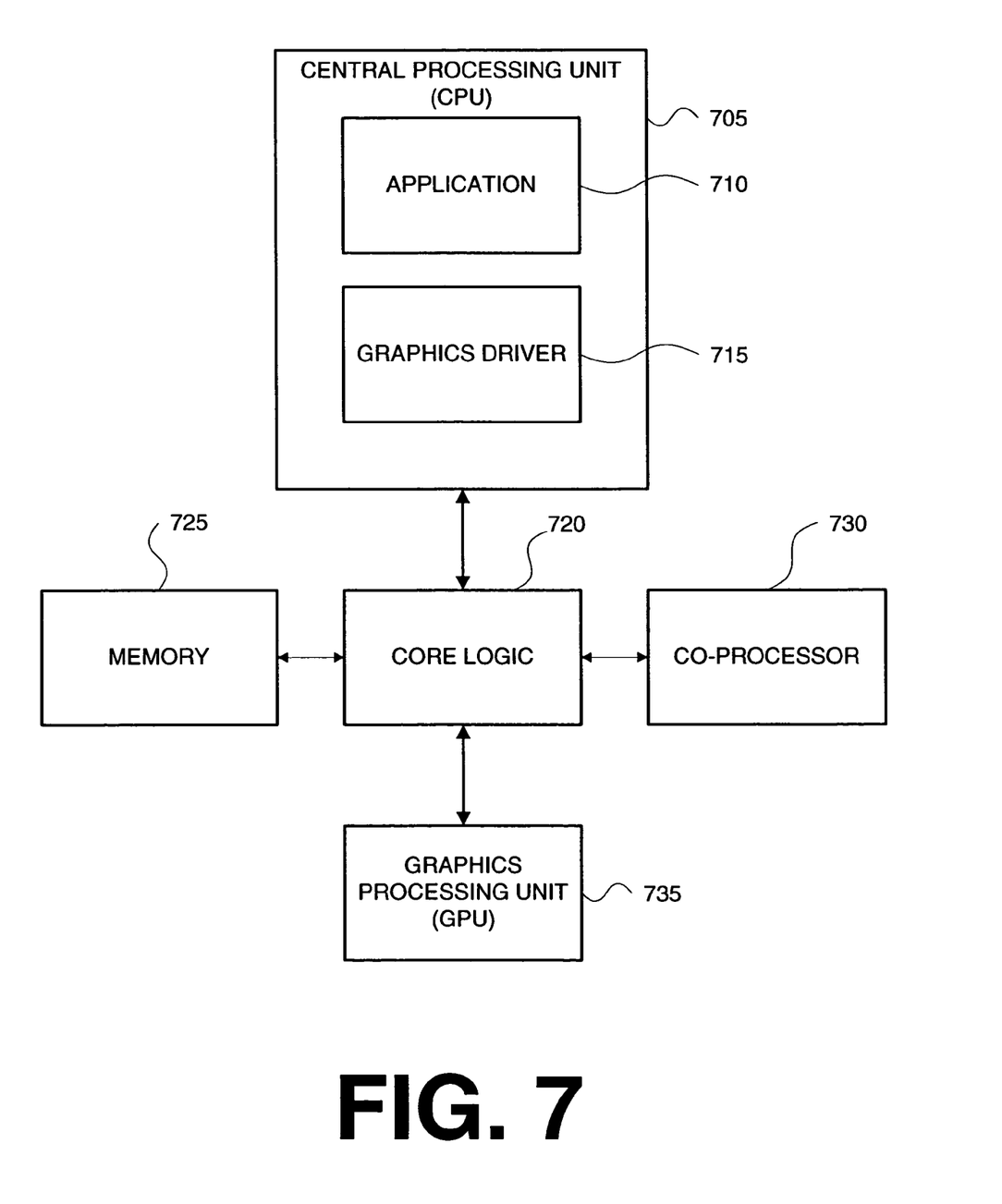
FIG. 7 is a block diagram of a functional system architecture illustrating an instantiation of a co-processor, according to another embodiment of the invention.

FIGS. 6 and 7 provide a more detailed view of the functional architectures described above. Any of the functional architectures described in the preceding section could be implemented in accordance with the description that follows with reference to FIG. 6 or 7. Other implementations are also possible.

FIG. 6 is a block diagram of a functional system architecture illustrating an instantiation of a co-processor, according to one embodiment of the invention. As shown therein, a CPU 605 includes application software 610 and a graphics driver 615. Core logic 620 includes an integrated co-processor 625. Core logic 620 may be or include, for example, a chipset, such as a Northbridge and/or a Southbridge. A Northbridge chip set typically connects a CPU to PCI busses and/or system memory; a Southbridge chip set typically controls a Universal Serial Bus (USB) and/or an Integrated Development Environment (IDE) bus, and/or performs power management, keyboard/mouse control, or other functions. Core logic 620 is operationally coupled to a memory 630 and a GPU 635. The memory 630 may be a system memory or a local memory. The integrated co-processor 625 accelerates the GPU 635 or other special-purpose processor.

FIG. 7 is a block diagram of a functional system architecture illustrating an instantiation of a co-processor, according to another embodiment of the invention. As shown therein, a CPU 705 includes application software 710 and a graphics driver 715. The CPU 705 is operationally coupled to a core logic 720. Core logic 720 may be or include, for example, a chipset, such as a Northbridge and/or a Southbridge. Core logic 720 is coupled to a memory 725, a co-processor 730 and a GPU 735. The coupling between the core logic 720 and the co-processor 730 may be a link compliant with Peripheral Component Interconnect (PCI) or other communication protocol. The memory 725 may be a system memory or a local memory. The integrated co-processor 730 accelerates the GPU 735 or other special-purpose processor.

In FIGS. 1–7, the CPU (605, 705) may be or include, for example, an Intel® Pentium® III Xeon™, Intel® Pentium® 4, Intel® Pentium® M, AMD Athlon™, or other CPU, according to design choice. The GPU (135, 225, 310, 410, 635, 735) may be or include, for instance, the NVIDIA® GeForce™ 256 GPU, the NVIDIA® Quadro® FX 500, NVIDIA® GeForce™ FX Go5200, NVIDIA® GeForce™ FX Go5600, or other GPU. In applications not related to graphics processing, special purpose processors which are not GPUs may be used.

FIGS. 8 and 9 provide exemplary applications for the invention in the graphics processing arena. Other applications not related to graphics processing can also benefit from a co-processor that is configured to accelerate a special purpose processor.

FIG. 8 is a process flow diagram of a method for performing vertex shading, according to an embodiment of the invention. The illustrated method pre-processes a vertex buffer data so that it can be rendered more quickly. As shown therein, a vertex buffer data A is created in step 805, vertices are culled or shaded in step 810, and vertex buffer data A is rendered in step 815. Accordingly, the vertex buffer data A is pre-processed in step 810 so that it can be rendered more quickly in step 815 than if pre-processing step 810 had not been performed. Steps 810 and 815 optionally utilize shader programs (not shown) to execute their respective processes. Step 805 may be executed by the graphics driver 110, step 810 may be performed by the co-processor (115, 205, 305, 405, 625, 730), and step 815 may be executed by the GPU (120, 210, 310, 410, 635, 735).

FIG. 9 is a process flow diagram of a method for performing two-pass Z-cull, according to an embodiment of the invention. In 3D imaging, the Z-axis is the axis coming out of the screen and toward the viewer's eye. Z-axis culling (Z-cull, a/k/a occlusion culling), generally, is the process of discarding a first group of primitives, where another primitive is to be rendered on the z-axis at a location between the first group of primitives and the viewer's eye. In other words, z-cull is the process of discarding primitives that would be blocked from view in a displayed image. In operation, Z-value comparisons are typically made for objects that share the same x and y space during the same frame to determine which are deemed to be visible, and which are to be culled.

In two-pass Z-cull, culling is performed in two steps. Accordingly, as illustrated in FIG. 9, primitives are received in step 905, then rendered in a first-pass z-cull step 910 to produce z-cull information. Then, in second-pass z-cull step 915, the first-pass z-cull information can be used to cull more primitives than would otherwise have been culled by a single-pass z-cull approach. Step 905 may be executed by the graphics driver 110, step 910 may be performed by the co-processor (115, 205, 305, 405, 625, 730), and step 915 may be executed by the GPU (120, 210, 310, 410, 635, 735).

In other applications, the co-processor (115, 205, 305, 405, 625, 730) performs other functions. For example, in graphics applications, the co-processor (115, 205, 305, 405, 625, 730) may perform the first pass of a two-pass stencil-shadow-volume algorithm for GPU acceleration, the first-pass of geometry processing for bounding-box and frustum culling, the implementation of memory copy on behalf of a driver such that the copy does not involve the CPU, the further acceleration of network packet processing done by a network controller, compression of input A to produce smaller input A' to save bandwidth, and/or data location management for faster access by a special purpose processor.

The embodiments described above can be more completely understood with reference to U.S. patent application Ser. No. 09/585,810 (filed May 31, 2000), Ser. No. 09/885,665 (filed Jun. 19, 2001), and Ser. No. 10/230,124 (filed Aug. 27, 2002), all of which are hereby incorporated by reference in their entirety.

CONCLUSION

Embodiments of the invention described above thus overcome the disadvantages of known systems methods by accelerating a special purpose processor, or a driver managing a special purpose processor, with one or more other special purpose processors. In addition, the disclosed approach is flexible, scalable, and can implemented in a way that is fault-tolerant and/or selective.

While this invention has been described in various explanatory embodiments, other embodiments and variations can be effected by a person of ordinary skill in the art without departing from the scope of the invention. For example, embodiments describing the use of a single co-processor could be modified to use multiple co-processors. Moreover, embodiments describing the use of a GPU could be modified for the use of a different type of special purpose processor, for instance in applications not related to graphics processing.

What is claimed is:

1. A method for processing data, comprising:
   outputting data from a driver to a co-processor and a special purpose processor;
   transforming the data in the co-processor;
   outputting the transformed data from the co-processor to the special purpose processor; and
   calculating a result in the special purpose processor based on the data and the transformed data, said calculating arriving at the result more quickly than if the special purpose processor had only received the data as an input.

2. The method of claim 1, wherein the driver is a graphics driver and the special purpose processor is a graphics processing unit.

3. The method of claim 2, wherein transforming the data includes performing a first pass z-cull and calculating the result includes performing a second pass z-cull.

4. A method for providing an output from a special purpose processor based on data from a driver element, comprising:
   receiving the data at the special purpose processor;
   determining whether a co-processor is operational;
   if the co-processor is operational,
      receiving transformed data from the co-processor in the special purpose processor; and
      calculating a result in the special purpose processor based on the data and the transformed data, said calculating arriving at the result more quickly than if the special purpose processor had only received the data as an input; and
   if the co-processor is not operational, calculating the result in the special purpose processor based only on the data received from the driver element.

5. The method of claim 4, wherein the driver is a graphics driver and the special purpose processor is a graphics processing unit.

6. The method of claim 4, further comprising receiving the data in the co-processor from the driver element if the co-processor is operational.

7. The method of claim 4, further comprising receiving the data in the co-processor from the special purpose processor if the co-processor is operational.

8. A system for processing data, comprising:
   a driver configured to output data;
   a co-processor coupled to the driver and configured to transform the data;
   a special purpose processor coupled to the driver and the co-processor, the special purpose processor configured to receive the data from the driver and the transformed data from the co-processor, the special purpose processor further configured to calculate a result based on the data and the transformed data more quickly than if the special purpose processor had only received the data as an input.

9. The system of claim 8, wherein the special purpose processor is further configured to determine whether the co-processor is operational, and calculate the result based only on the data if the co-processor is not operational.

10. The system of claim 8, wherein the driver is a graphics driver and the special purpose processor is a graphical processing unit.

11. The system of claim 10, wherein the transformed data includes a first pass z-cull information and the result includes a second pass z-cull information.

12. A machine-readable medium having instructions stored thereon for execution by a processor to perform the method comprising:
   outputting data from a driver to a co-processor and a special purpose processor;
   transforming the data in the co-processor;
   outputting the transformed data from the co-processor to the special purpose processor; and
   calculating a result in the special purpose processor based on the data and the transformed data, said calculating arriving at the result more quickly than if the special purpose processor had only received the data as an input.

13. A machine-readable medium having instructions stored thereon for execution by a processor to perform a method for providing an output from a special purpose processor based on data from a driver element, the method comprising:
  receiving the data at the special purpose processor;
  determining whether a co-processor is operational;
  if the co-processor is operational,
    receiving transformed data from the co-processor in the special purpose processor; and
    calculating a result in the special purpose processor based on the data and the transformed data, said calculating arriving at the result more quickly than if the special purpose processor had only received the data as an input; and
  if the co-processor is not operational, calculating the result in the special purpose processor based only on the data received from the driver element.

14. A method for processing data, comprising:
  outputting data from a driver to a special purpose processor;
  outputting the data from the special purpose processor to a co-processor;
  transforming the data in the co-processor;
  outputting the transformed data from the co-processor to the special purpose processor; and
  calculating a result in the special purpose processor based on the data and the transformed data, said calculating arriving at the result more quickly than if the special purpose processor had only received the data as an input.

15. The method of claim 14, wherein the driver is a graphics driver and the special purpose processor is a graphics processing unit.

16. A method for processing data, comprising:
  outputting data from a driver to a special purpose processor and a co-processor;
  transforming the data in the co-processor;
  outputting the transformed data from the co-processor to the driver;
  outputting the transformed data from the driver to the special purpose processor; and
  calculating a result in the special purpose processor based on the data and the transformed data, said calculating arriving at the result more quickly than if the special purpose processor had only received the data as an input.

17. The method of claim 16, wherein the driver is a graphics driver and the special purpose processor is a graphics processing unit.

18. A method for providing an output from a special purpose processor based on data from a driver element, comprising:
  receiving the data at the special purpose processor;
  determining whether a co-processor is operational;
  if the co-processor is operational,
    receiving transformed data from the co-processor in the driver element;
    transmitting the transformed data from the driver to the special purpose processor; and
    calculating a result in the special purpose processor based on the data and the transformed data, said calculating arriving at the result more quickly than if the special purpose processor had only received the data as an input; and
  if the co-processor is not operational, calculating the result in the special purpose processor based only on the data received from the driver element.

19. A method for processing data, comprising:
  outputting data from a driver to a special purpose processor;
  outputting the data to a co-processor selectively from one of the driver and the special purpose processor;
  transforming the data in the co-processor;
  if the data is outputted to the co-processor from the driver, selectively outputting the transformed data from the co-processor to one of the driver and the special purpose processor; and
    if the transformed data is output to the driver, outputting the transformed data from the driver to the special purpose processor;
  if the data is outputted to the co-processor from the special purpose processor, outputting the transformed data from the co-processor to the special purpose processor; and
  calculating a result in the special purpose processor based on the data and the transformed data, said calculating arriving at the result more quickly than if the special purpose processor had only received the data as an input.

20. A method for processing graphics data, comprising:
  creating vertex buffer data in a driver;
  transforming the vertex buffer data to produce transformed vertex buffer data, said transforming including at least one of culling and shading a plurality of vertices in the vertex buffer data using a co-processor;
  receiving the transformed vertex buffer data in a special purpose processor; and
  rendering the vertex buffer data using the transformed vertex buffer data, the rendering performed in the special purpose processor, said rendering performed more quickly than if the special purpose processor had received the vertex buffer data and not the transformed vertex buffer data.

21. A method for selectively using a co-processor, comprising:
  determining whether use of a co-processor would improve performance;
  processing an input in a special purpose processor if it is determined that use of the co-processor would not improve performance; and
  processing a transformed input in the special purpose processor if it is determined that use of the co-processor would improve performance, the transformed input being a result of processing of the input by the co-processor.

22. The method of claim 21, further comprising processing the input in the special processor if it is determined that use of the co-processor would improve performance.

23. The method of claim 21, wherein determining is based on a predetermined list of applications where performance is improved through use of the co-processor.

24. The method of claim 21, wherein determining is based on historical performance data for a task.

25. The method of claim 21, wherein determining is based on near instantaneous knowledge.

26. A machine-readable medium having instructions stored thereon for execution by a processor to perform a method comprising:
  outputting data from a driver to a special purpose processor;
  outputting the data from the special purpose processor to a co-processor;
  transforming the data in the co-processor;

outputting the transformed data from the co-processor to the special purpose processor; and calculating a result in the special purpose processor based on the data and the transformed data, said calculating arriving at the result more quickly than if the special purpose processor had only received the data as an input.

27. A machine-readable medium having instructions stored thereon for execution by a processor to perform a method comprising:

outputting data from a driver to a special purpose processor and a co-processor;

transforming the data in the co-processor;

outputting the transformed data from the co-processor to the driver;

outputting the transformed data from the driver to the special purpose processor; and calculating a result in the special purpose processor based on the data and the transformed data, said calculating arriving at the result more quickly than if the special purpose processor had only received the data as an input.

28. A machine-readable medium having instructions stored thereon for execution by a processor to perform a method comprising:

determining whether use of a co-processor would improve performance;

processing an input in a special purpose processor if it is determined that use of the co-processor would not improve performance; and processing a transformed input in the special purpose processor if it is determined that use of the co-processor would improve performance, the transformed input being a result of processing of the input by the co-processor.

* * * * *